United States Patent
Lee et al.

(10) Patent No.: US 8,245,523 B2
(45) Date of Patent: Aug. 21, 2012

(54) MULTI-AIR CONDITIONER

(75) Inventors: Chung Hun Lee, Changwon-si (KR);
Sun Ho Hwang, Changwon-si (KR);
Gwi Guen Park, Changwon-si (KR);
Han Su Jung, Changwon-si (KR)

(73) Assignee: LG Electronics Inc., Seoul (KR)

( * ) Notice: Subject to any disclaimer, the term of this patent is extended or adjusted under 35 U.S.C. 154(b) by 636 days.

(21) Appl. No.: 12/310,627

(22) PCT Filed: Nov. 29, 2007

(86) PCT No.: PCT/KR2007/006109
§ 371 (c)(1),
(2), (4) Date: Apr. 20, 2009

(87) PCT Pub. No.: WO2008/066343
PCT Pub. Date: Jun. 5, 2008

(65) Prior Publication Data
US 2010/0186441 A1  Jul. 29, 2010

(30) Foreign Application Priority Data

Nov. 29, 2006 (KR) .................. 10-2006-0119110
Nov. 14, 2007 (KR) .................. 10-2007-0116177

(51) Int. Cl.
*F25B 49/00* (2006.01)
*F25D 17/00* (2006.01)
(52) U.S. Cl. ...................... 62/177; 62/228.1; 363/40
(58) Field of Classification Search .............. 62/132, 62/175, 177, 228.1; 363/40
See application file for complete search history.

(56) References Cited

U.S. PATENT DOCUMENTS

| 4,849,950 A * | 7/1989 | Sugiura et al. .......... 363/48 |
| 6,153,993 A * | 11/2000 | Oomura et al. .......... 318/434 |
| 2006/0130504 A1* | 6/2006 | Agrawal et al. .......... 62/228.4 |

FOREIGN PATENT DOCUMENTS

| JP | 2002-228197 | 8/2002 |
| KR | 10-1999-0070381 A | 9/1999 |

* cited by examiner

*Primary Examiner* — Marc Norman
(74) *Attorney, Agent, or Firm* — McKenna Long & Aldridge LLP

(57) ABSTRACT

An air conditioner is provided. A control unit of an outdoor unit of the air conditioner is divided into a plurality of blocks according to a set of rules. Then, the blocks are mounted on different substrates. Therefore, it is possible to simplify wiring, facilitating the interconnection of the blocks and enable the control unit to be managed in units of the blocks. In addition, it is possible to improve user convenience.

16 Claims, 4 Drawing Sheets

[Fig. 1]
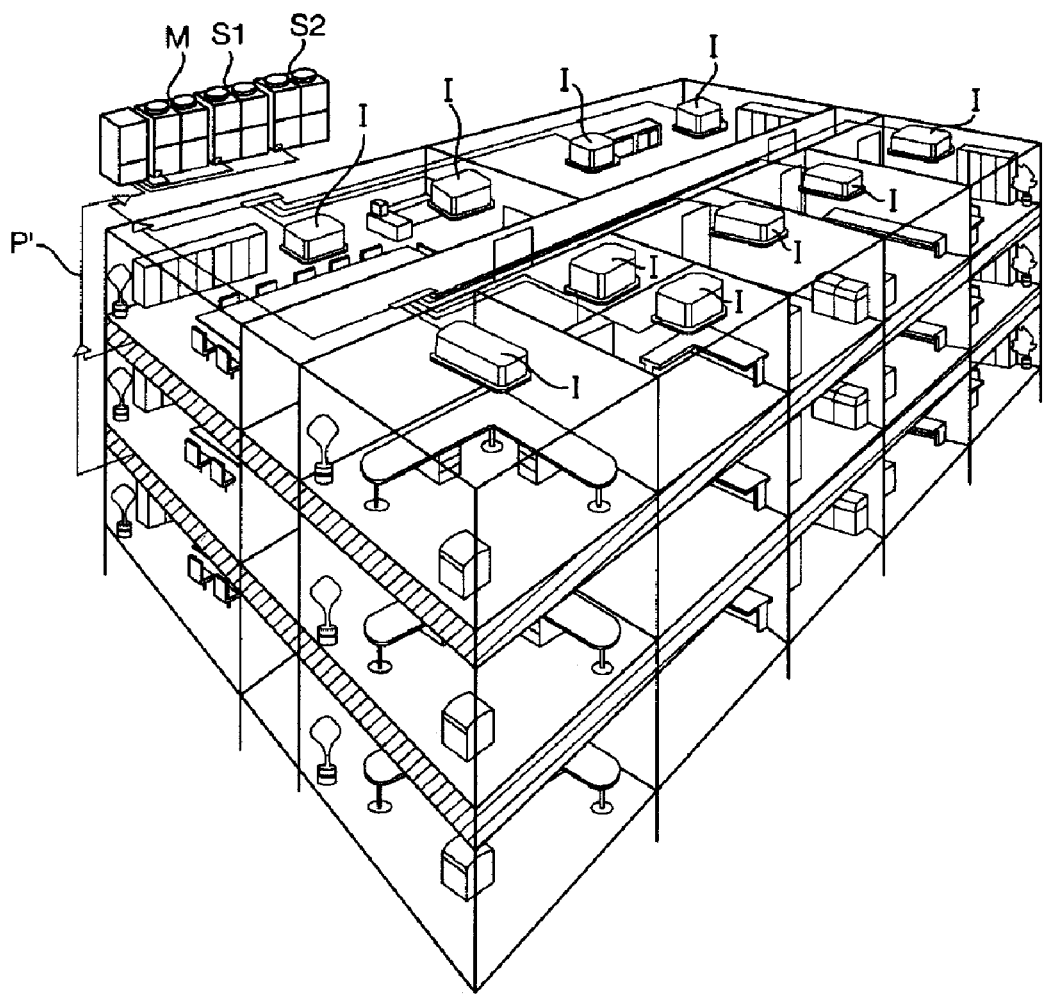

[FIG. 2]
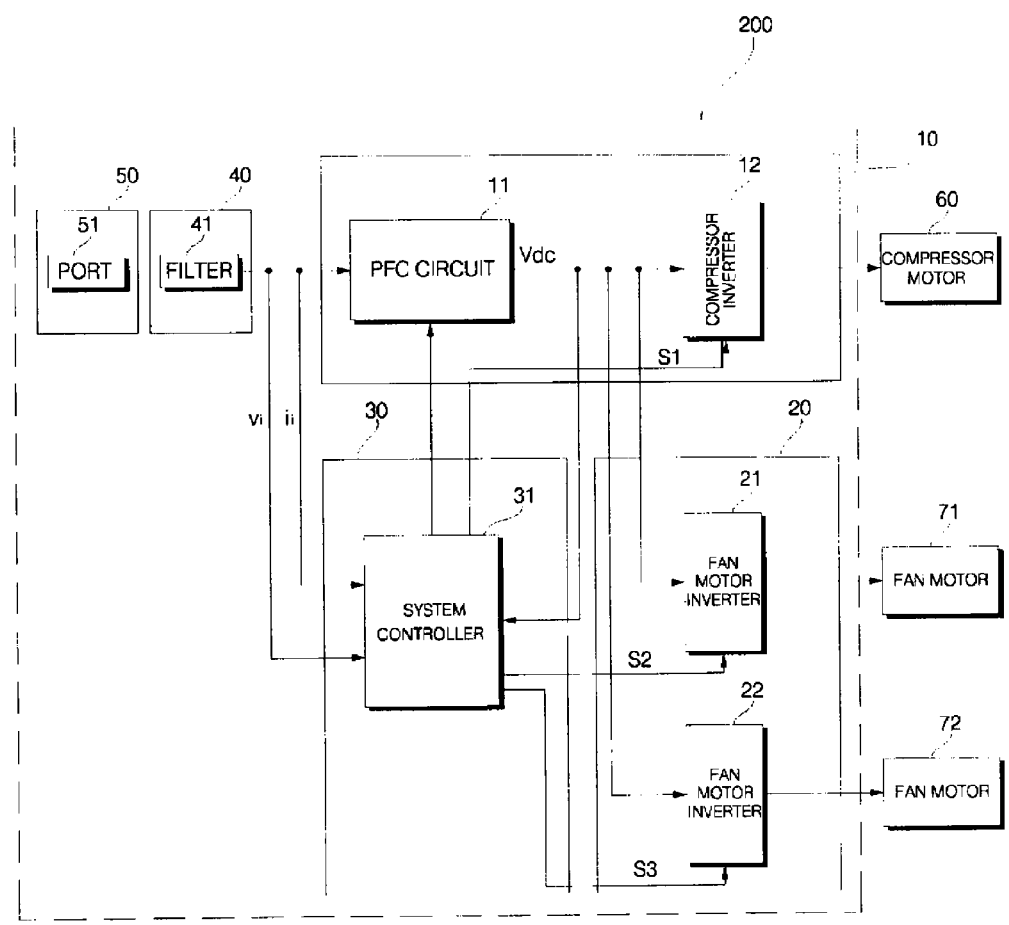

[Fig. 3]
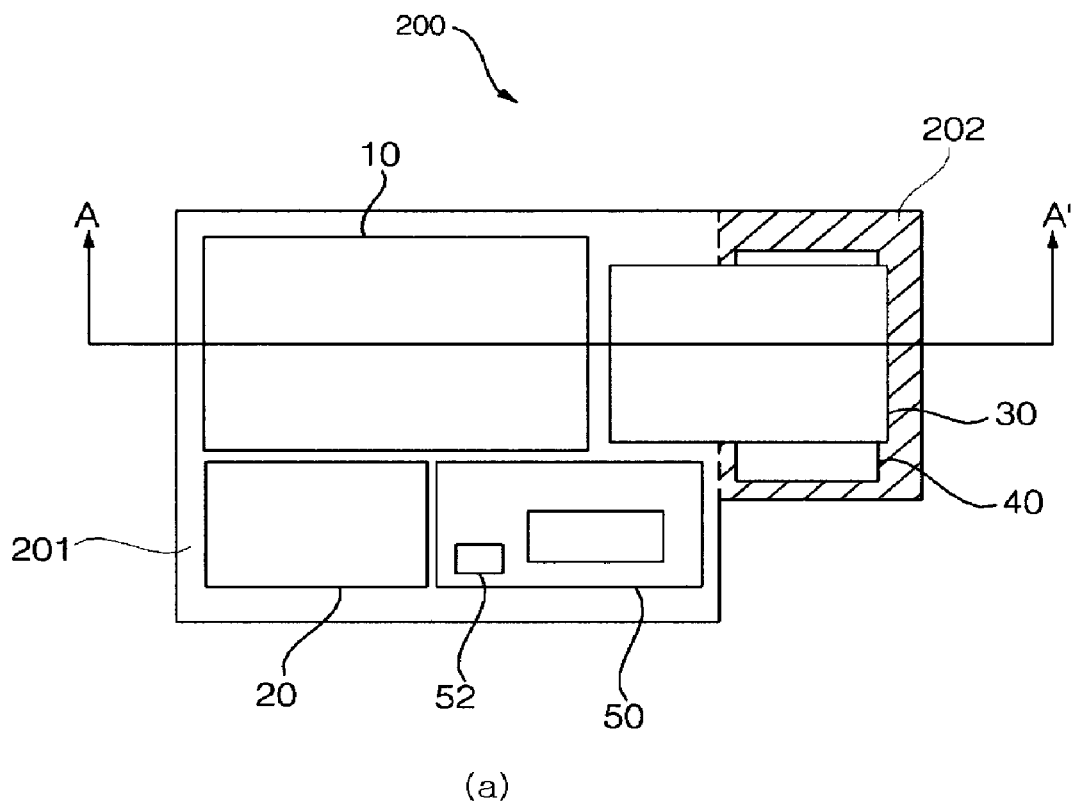
(a)
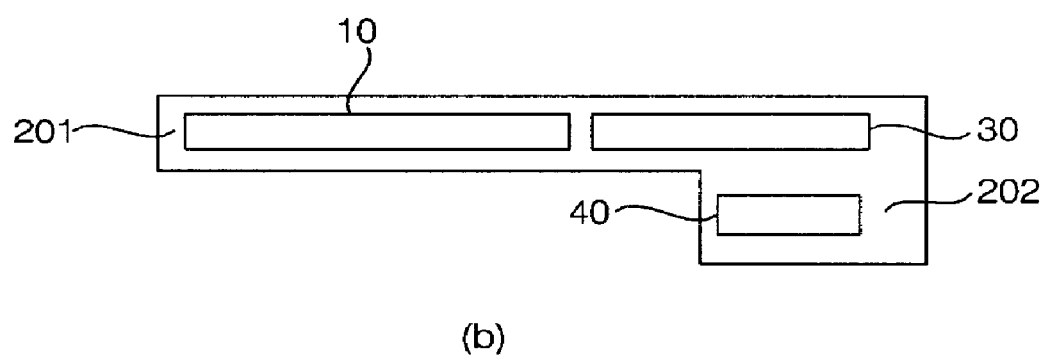
(b)

[Fig. 4]
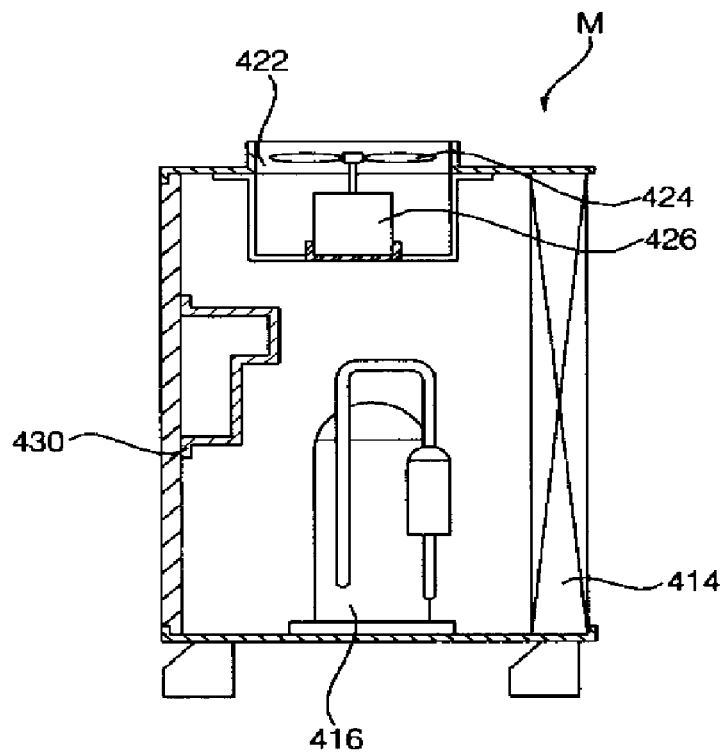
(a)
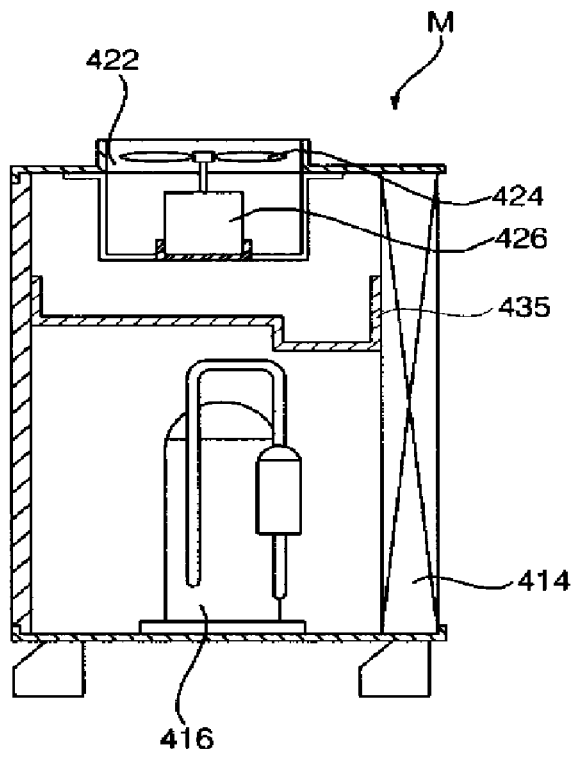
(b)

MULTI-AIR CONDITIONER

This application claims the benefit of PCT/KR2007/006109 filed on Nov. 29, 2007, and Korean Patent Application Nos. 10-2006-0119110 and 10-2007-0116177 filed on Nov. 29, 2006 and Nov. 14, 2007 respectively, the contents of which are hereby incorporated herein by reference for all purposes in their entirety.

TECHNICAL FIELD

The present invention relates to an air conditioner, and more particularly, to an air conditioner in which a control unit for controlling the operation of an outdoor unit is divided into a plurality of blocks according to a set of rules and can thus be efficiently arranged.

BACKGROUND ART

Air conditioners are devices for cooling or warming indoor spaces such as homes, restaurants, or offices. In order to efficiently cool or warm an indoor space divided into a plurality of rooms, multi-air conditioners capable of cooling or warming a plurality of rooms have been developed. A multi-air conditioner includes a plurality of indoor units which are all connected to one outdoor unit and are installed in different rooms. Then, each of the indoor units may be driven in either a heating mode or a cooling mode so that an air conditioning function can be provided.

A typical air conditioner is generally divided into an indoor unit having a heat exchanger and an outdoor unit having a compressor and a heat exchanger and is driven by controlling the supply of power and a coolant to the compressor or the heat exchangers.

However, in the case of conventional air conditioners, a plurality of power modules of a control unit for controlling an outdoor fan and a compressor or a heat exchanger in an indoor unit are designed as linear transformers, and thus, the interconnection between the power modules is very complicated. Accordingly, the reliability of the control unit may considerably deteriorate, additional cost for handling electromagnetic interference (EMI) may be incurred, and it may become difficult to alter control variables.

DISCLOSURE OF INVENTION

Technical Problem

The present invention provides an air conditioner in which wiring can be simplified and the operating efficiency of a control unit for controlling the operation of an outdoor unit can be improved by dividing the control unit into a plurality of blocks according to a set of rules.

Technical Solution

According to an aspect of the present invention, there is provided an air conditioner including a plurality of indoor units; and at least one outdoor unit, wherein the outdoor unit includes a control unit. The control unit includes a first block having a compressor inverter for controlling a compressor motor, a second block having at least one fan motor inverter for driving at least one fan motor, a third block having a system controller for controlling the operation of the outdoor unit, a fourth block having a filter for removing noise from input three-phase power, and a fifth block to which the input three-phase power is applied. The first, second, third, fourth and fifth blocks are mounted on different substrates.

According to another aspect of the present invention, there is provided an air conditioner including a plurality of indoor units; and at least one outdoor unit, wherein the outdoor unit includes a control unit. The control unit controls the operation of the outdoor unit. The control unit includes a power factor compensation (PFC) circuit which converts alternating current (AC) power provided by a commercial AC power source into direct current (DC) power and a compressor inverter which drives a compressor motor by converting the DC power into AC power. The PFC circuit and the compressor inverter are both mounted on a first substrate.

Advantageous Effects

As described above, according to the present invention, a control unit is divided into a number of blocks which are mounted on different substrates, and blocks that perform similar operations or need to transmit/receive signals to/from each other are disposed close to each other. Thus, it is possible to improve the efficiency of the transmission of signals, simplify the interconnection of the blocks, and reduce the length of interconnection. Therefore, it is possible to reduce unnecessary resistance and noise. In addition, it is easy to modify the arrangement of wires and alter control variables in units of the blocks. Therefore, it is possible to improve the operating efficiency of the control unit, facilitate the management of the control unit, and maximize user convenience.

BRIEF DESCRIPTION OF THE DRAWINGS

FIG. 1 illustrates a diagram of an air conditioner according to an embodiment of the present invention;

FIG. 2 illustrates a block diagram of an outdoor unit of an air conditioner according to an embodiment of the present invention;

FIGS. 3A and 3B illustrate diagrams of the outdoor unit illustrated in FIG. 2; and FIGS. 4A and 4B illustrate cross-sectional views of embodiments of a main outdoor unit.

BEST MODE FOR CARRYING OUT THE INVENTION

The present invention will hereinafter be described in detail with reference to the accompanying drawings in which exemplary embodiments of the invention are shown.

FIG. 1 illustrates a diagram of an air conditioner according to an embodiment of the present invention. Referring to FIG. 1, the air conditioner includes a plurality of indoor units I which are installed in a room and one or more outdoor units M, S1 and S2 which are connected to the indoor units I. The indoor units I and the outdoor units M, S1 and S2 are connected to one another through a coolant pipe P' and can thus perform either a cooling operation or a heating operation according to the flow of a coolant. The air conditioner may also include a distributor which controls the supply of a coolant from the outdoor units M, S1 and S2 to the indoor units I and a central control unit which is connected to the outdoor units M, S1 and S2 and the indoor units I. Data may be transmitted between the indoor units I and the outdoor units M, S1 and S2 so that the indoor units I can monitor the operating state of the outdoor units M, S1 and S2 and vice versa.

The air conditioner may include at least one indoor unit I. If the air conditioner includes more than one indoor unit I all installed in one room, the indoor units I may be controlled independently through a remote control. Alternatively, the indoor units I may be divided into a number of groups and may be controlled through a remote control in units of the groups.

The outdoor units M, S1 and S2 include a main outdoor unit M and two auxiliary outdoor units S1 and S2 which are driven at the request of at least one of the indoor units I. If more than a predefined number of outdoor units I are driven, the main outdoor unit M may be driven. Then, if a required cooling/heating capacity exceeds the operating capacity of the main outdoor unit M, the auxiliary outdoor units S1 and S2 may be driven. That is, how many of the main outdoor unit M and the auxiliary outdoor units S1 and S2 are to be driven may be determined according to the required cooling/heating capacity. In addition, the operation of a compressor (not shown) installed in the outdoor units M, S1 and S2, respectively, may vary according to the required cooling/heating capacity.

FIG. 2 illustrates a block diagram of an outdoor unit of an air conditioner according to an embodiment of the present invention, FIG. 3A illustrates a schematic diagram of the outdoor unit illustrated in FIG. 2, and FIG. 3B illustrates a cross-sectional view taken along line A-A' of FIG. 3A.

Referring to FIG. 2, the outdoor unit is powered by an external power source and drives one or more compressors installed therein. The number of compressors installed in the outdoor unit is determined according to the cooling/heating capacity of the outdoor unit. The outdoor unit exchanges heat with the aid of a heat exchanger, and supplies a coolant ejected from the compressors into an indoor unit.

The outdoor unit includes a control unit 200 which supplies power to the compressors, the heat exchanger, and an outdoor fan and controls the operations of the compressors, the heat exchanger, and the outdoor fan. More specifically, the control unit 200 converts power supplied by an external power source into operating power for driving the compressors, the heat exchanger, and the outdoor fan and supplies the operating power to the compressors, the heat exchanger, and the outdoor fan. In addition, the control unit 200 generates a control signal based on data provided by a plurality of sensors.

Referring to FIGS. 2 and 3, the control unit 200 may be divided into a plurality of first through fifth blocks 10 through 50 according to a set of rules. The first through fifth blocks 10 through 50 may be mounted on different substrates. More specifically, circuits and elements of the control unit 200 that perform similar functions or correlated functions may be mounted on the same substrate.

The first block 10 includes a compressor inverter 12 which controls a compressor motor 60. The second block 20 includes first and second fan motor inverters 21 and 22 which drive at least one fan motor for rotating the outdoor fan. The third block 30 includes a system controller 31 which controls the operation of the outdoor unit. The fourth block 40 includes a filter 41 which removes noise from input three-phase power. The input three-phase power is applied to the fifth block 50. The first through fifth blocks 10 through 50 may be respectively mounted on first through fifth substrates (not shown). The first through fifth blocks 10 through 50 are connected to one another and transmit/receive to/from one another.

The first and second blocks 10 and 20 may be disposed close to each other. In addition, the first and second blocks 10 and 20 are disposed on one sides of the third block 30. The first and third blocks 10 and 30 are disposed close to each other. The fourth and fifth blocks 40 and 50 are disposed close to each other. The fourth block 40 is disposed on one side of the fifth block 50. The fourth block 40 may be disposed below the third block 30.

That is, the first, third and fourth blocks 10, 30 and 40 may be disposed near a first lateral side of the control unit 200. The second and fifth blocks 20 and 50 may be disposed near a second lateral side of the control unit 200, which is a predetermined distance apart from the first lateral side and is opposite to the first lateral side. The first and second blocks 10 and 20 may be disposed near a third lateral side of the control unit 200, which perpendicularly intersects the first lateral side. The third and fourth blocks 30 and 40 may be disposed near a fourth lateral side of the control unit 200, which is a predetermined distance apart from the third lateral side and is opposite to the third lateral side.

A plurality of input/output (I/O) ports may be disposed on at least one side of the first through fifth substrates on which the first through fifth blocks 10 through 50 are respectively mounted, thereby facilitating the transmission of signals and data among the first through fifth blocks 10 through 50.

The fifth block 50 includes the terminal port 51 to which a three-phase four-wire system power source (not shown) is connected. The fifth block 50 may also include a compressor connection port 52 to which a constant-rate compressor (not shown) is connected. The terminal port 51 and the compressor connection port 52 are both mounted on the fifth substrate.

The fourth block 40 includes the noise filter 41 for electromagnetic compatibility (EMC). The fourth block 40 may also include a plurality of inductors or reactors. The noise filter 41 and the inductors may be mounted on the fourth substrate. The fourth block 40 is connected to the terminal port 51 of the fifth block 50, and thus, the noise filter 41 and the inductors can remove noise from three-phase power supplied thereto through the terminal port 51. The fourth block 40 is also connected to the first block 10, and thus, the three-phase power with noise removed therefrom can be supplied to the first block 10.

The first block 10 may include the compressor inverter 12 for controlling the compressor motor 60 and a power factor compensation (PFC) circuit 11 for compensating for the power factor of three-phase power supplied to the first block 10 from the fourth block 40. The PFC circuit 11 and the compressor inverter 12 may both be mounted on the first substrate.

The PFC circuit 11 includes a three-phase pulse width modulation (PWM) converter (not shown) which is connected to a commercial alternating current (AC) power source, i.e., a three-phase AC power source, converts three-phase power into a direct current (DC) voltage, and outputs the DC voltage; and a PFC controller (not shown) which controls the three-phase PWM converter. A controller exclusively for PFC may be used as the PFC controller. Alternatively, the system controller 31 of the third block may serve as the PFC controller. The PFC controller measures the current and voltage of three-phase AC power input to the three-phase PWM converter, and generates a switching control signal for controlling the three-phase PWM converter based on the results of the measurement and the DC voltage output by the three-phase PWM converter. The PFC circuit 11 may also include a current detector (not shown) which measures an input current ii, a voltage detector (not shown) which detects an input voltage vi, and an output voltage detector (not shown) which detects an output voltage Vdc.

The compressor inverter 12 is connected to the compressor motor 60. The compressor inverter 12 receives the AC power Vdc output by the PFC circuit 11 and generates operating power for the compressor motor 60 based on the AC power Vdc. The operating power generated by the compressor inverter 12 is AC power having a predefined frequency. The compressor inverter 12 may include a plurality of switching devices. Thus, the compressor inverter 12 may controls the operation of the compressor motor 60 by performing a switching operation in response to a control signal S1.

At least one of a blushless DC (BLDC) motor and a synchronous reluctance motor may be used as the compressor motor 60. The compressor motor 60 may be a sensorless-type motor.

The second block 20 is connected to the first and third blocks 10 and 30 and controls at least one outdoor fan. The second block 20 may include one or more fan motor inverters, i.e., the first and second fan motor inverters 21 and 22 which are respectively connected to the first and second fan motors 71 and 72 and supplies operating power for the first and second fan motors 71 and 72. The fan motor inverters 21 and 22 may be mounted on the second substrate. The first and second fan motors 71 and 72 rotate an outdoor fan (not shown) which is disposed on one side of a heat exchanger (not shown). The control unit 200 may include at least one fan motor, and the number of fan motors included in the control unit 200 may be determined according to the heat exchange capacity of the outdoor unit. If the control unit 200 includes two fan motors, i.e., the first and second fan motors 71 and 72, the first and second fan motors 71 and 72 may be BLDC motors or synchronous reluctance motors. The first and second fan motors 71 and 72 may be sensorless type- or sensor-type motors.

The control unit 200 may include as many fan motor inverters as there are fan motors. Thus, if the control unit 200 includes two fan motors, two fan motor inverters respectively connected to the two fan motors may be provided.

The first and second fan motor inverters 21 and 22 are connected to the PFC circuit 11 of the first block 10 and receive the AC voltage Vdc output by the PFC circuit 11. The first and second fan motor inverters 21 and 22 are driven in response to control signals S2 and S3 applied by the system controller 31 of the third block 30 and generate operating power for driving the first and second fan motors 71 and 72.

The third block 30 includes the system controller 31 which generally controls the operation of the outdoor unit. The system controller 31 is mounted on the third substrate.

The system controller 31 applies the control signal S1 to the compressor inverter 12 of the first block 10. If the system controller 31 performs the functions of a PFC controller, the system controller 31 may perform PFC. On the other hand, if the system controller 31 does not perform the functions of a PFC controller, a PFC controller may be provided in the PFC circuit 11. Then, the system controller 31 may be connected to the PFC controller and control the operation of the PFC circuit 11.

The system controller 31 may control the PFC circuit 11 not to operate if the DC voltage Vdc output by the PFC circuit 11 is lower than a predefined voltage, if a command to drive a compressor is yet to be input, if the first block 10 is improperly interconnected, if the temperature of the first block 10 is higher than a predefined temperature, or if an excessively high voltage or current is generated.

In addition, the system controller 31 may control the PFC circuit not to operate if the frequency or magnitude of input power is beyond a predefined range, if a compressor operating signal is yet to be input, if the DC voltage Vdc output by the PFC circuit 11 is beyond a predefined range, and/or if the speed or power of a compressor is lower than a reference value. Moreover, the system controller 31 may control the operation of the PFC circuit 11 to be terminated if an error occurs in the PFC circuit 11 or if an excessively high current or voltage is generated.

The system controller 31 applies the control signals S2 and S3 to the first and second fan motor inverters 21 and 22 of the second block 20 and controls the first and second fan motors 71 and 72 at the same time.

The system controller 31 may also control the compressor inverter 12 and the first and second fan motor inverters 21 and 22. The system controller 31 may also control the PFC circuit 11.

FIGS. 4A and 4B illustrate cross-sectional views of embodiments of a main outdoor unit M of an air conditioner.

Referring to FIG. 4A, the main outdoor unit M includes an outdoor heat exchanger 414 which condenses a coolant; a compressor 416 which compresses a coolant evaporated by an indoor heat exchanger (not shown) so that a coolant having a high temperature and pressure can be supplied into the outdoor heat exchanger 414; an outdoor fan 424 which generates blowing power so that air blown into the outdoor heat exchanger 414 can be ejected into the outside of a room through an air ejection hole 422; an outdoor fan motor 426 which rotates the outdoor fan 424; and a control box 430 which includes a control unit. The control box 430 is disposed on a lateral side of the main outdoor unit M so that an area in which a fourth block of the control unit is disposed can have a step difference.

The main outdoor unit M illustrated in FIG. 4B has a similar structure to that of the main outdoor unit M illustrated in FIG. 4A except that a control box 435 is disposed in the middle of the main outdoor unit M, instead of being disposed on a lateral side of the main outdoor unit M. In the main outdoor unit M illustrated in FIG. 4B, like in the main outdoor unit M illustrated in FIG. 4A, an area in which the control box 435 is installed has a step difference.

In the embodiments of FIGS. 4A and 4B, like in the embodiment of FIGS. 2 and 3, a control unit of an outdoor unit is divided into first through fifth blocks. Since the first through fifth blocks are mounted on different substrates, it is possible to simplify the interconnection of the first through fifth blocks. In addition, since blocks that perform similar operations or need to transmit/receive signals to/from each other are disposed close to each other, it is possible to improve the operating efficiency of an air conditioner.

While the present invention has been particularly shown and described with reference to exemplary embodiments thereof, it will be understood by those of ordinary skill in the art that various changes in form and details may be made therein without departing from the spirit and scope of the present invention as defined by the following claims.

INDUSTRIAL APPLICABILITY

According to the present invention, it can be used in air conditioner in which a control unit for controlling the operation of an outdoor unit is divided into a plurality of blocks according to a set of rules and can thus be efficiently arranged.

The invention claimed is:

1. An air conditioner comprising:
a plurality of indoor units; and
at least one outdoor unit,
wherein the outdoor unit includes an outdoor heat exchanger for condensing a coolant, a compressor for compressing a coolant evaporated by an indoor heat exchanger, an outdoor fan, and a control box including a control unit for controlling operations of the compressor and the outdoor fan, wherein the control unit which has a first block comprising a compressor inverter for controlling a compressor motor, a second block comprising a plurality of fan motor inverters for driving a plurality of fan motors, a third block comprising a system controller for controlling the operation of the outdoor unit, a fourth block comprising a filter for removing noise from input three-phase power, and a fifth block to which the input three-phase power is applied, the first, second, third, fourth and fifth blocks being mounted on different substrates, wherein the control box is disposed between the compressor and the outdoor fan, and the control box has a step difference so that the fourth block of the control unit is disposed below other blocks of the control unit, wherein the first block further comprises a power factor compensation (PFC) circuit which compensates the power factor of the input three-phase power, wherein the system controller controls the compressor inverter, the fan motor inverters, and the PFC circuit, wherein the system controller controls a first and a second fan motors of the plurality of fan motors at the same time.

2. The air conditioner of claim 1, wherein the fan motor inverters are connected to the PFC circuit and converts direct current (DC) power output by the PFC circuit into power for controlling the fan motor.

3. The air conditioner of claim 1, wherein the fourth block further comprises a plurality of inductors.

4. The air conditioner of claim 1, wherein the fifth block comprises a terminal port to which a three-phase four-wire system power source is connected.

5. The air conditioner of claim 1, wherein the fifth block comprises a connection terminal to which a constant-rate compressor is connected.

6. The air conditioner of claim 1, wherein the compressor inverter is connected to the PFC circuit and converts DC power output by the PFC circuit into power for controlling the compressor motor.

7. The air conditioner of claim 1, wherein the system controller controls the PFC circuit not to operate if a DC voltage output by the PFC circuit is lower than a predefined voltage, if a command to drive a compressor is yet to be input, if the first block is improperly interconnected, if the temperature of the first block is higher than a predefined temperature, if the frequency or magnitude of input power is beyond a predefined range, or if speed or power of the compressor is lower than a reference value.

8. The air conditioner of claim 1,
wherein the control box is disposed on a lateral side of the outdoor unit.

9. An air conditioner comprising:
a plurality of indoor units; and
at least one outdoor unit,
wherein the outdoor unit includes an outdoor heat exchanger for condensing a coolant, a compressor for compressing a coolant evaporated by an indoor heat exchanger, an outdoor fan, and a control box including a control unit for controlling operations of the compressor and the outdoor fan, wherein the control unit which controls the operation of the outdoor unit and comprises a PFC circuit that converts AC power provided by a commercial AC power source into DC power, a compressor inverter that drives a compressor motor by converting the DC power into AC power, the PFC circuit and the compressor inverter both being mounted on a first substrate, a plurality of one fan motor inverter which drives at least one fan motor by converting the DC power into AC power, the fan motor inverter being mounted on a second substrate, a system controller which controls the operation of the outdoor unit, the system controller being mounted on a third substrate, and a filter which removes noise between the commercial AC power source and the PFC circuit, the filter being mounted on a fourth substrate, wherein the control box is disposed between the compressor and the outdoor fan, and the control box has a step difference so that the fourth block of the control unit is disposed below other blocks of the control unit wherein the system controller controls the compressor inverter, the fan motor inverters, and the PFC circuit, wherein the system controller controls a first and a second fan motors of the plurality of fan motors at the same time.

10. The air conditioner of claim 9, wherein the control unit further comprises a terminal port to which the commercial AC power source is connected, the terminal port being mounted on a fifth substrate.

11. The air conditioner of claim 10, wherein the control unit further comprises a connection port to which a constant-rate compressor is connected, the connection port being mounted on the fifth substrate.

12. The air conditioner of claim 10, wherein the first, third and fourth substrates are disposed on a first lateral side of the control unit, and the second and fifth substrates are disposed on a second lateral side of the control unit, the second lateral side being opposite to the first lateral side.

13. The air conditioner of claim 12, wherein the first and second substrates are disposed on a third lateral side of the control unit, the third lateral side perpendicularly intersecting the first lateral side.

14. The air conditioner of claim 13, wherein the third and fourth substrates are disposed on a fourth lateral side of the control unit, the fourth lateral side being opposite to the third lateral side.

15. The air conditioner of claim 9, wherein the system controller controls the PFC circuit not to operate if a DC voltage output by the PFC circuit is lower than a predefined voltage, if a command to drive a compressor is yet to be input, if the first block is improperly interconnected, if the temperature of the first block is higher than a predefined temperature, if the frequency or magnitude of input power is beyond a predefined range, or if speed or power of the compressor is lower than a reference value.

16. The air conditioner of claim 9,
wherein the control box is disposed on a lateral side of the outdoor unit.

* * * * *